Oct. 24, 1950

J. A. GUYER 2,526,657

METHOD OF CONTACTING VAPORS WITH
A SOLID CATALYTIC MATERIAL

Filed July 13, 1945

INVENTOR
J. A. GUYER

BY Hudson and Young
ATTORNEYS

Oct. 24, 1950

J. A. GUYER 2,526,657

METHOD OF CONTACTING VAPORS WITH
A SOLID CATALYTIC MATERIAL

Filed July 13, 1945

INVENTOR
J. A. GUYER
BY *Hudson and Young*
ATTORNEYS

Patented Oct. 24, 1950

2,526,657

UNITED STATES PATENT OFFICE 2,526,657

METHOD OF CONTACTING VAPORS WITH A SOLID CATALYTIC MATERIAL

Jesse A. Guyer, Bartlesville, Okla., assignor to Phillips Petroleum Company, a corporation of Delaware Application July 13, 1945, Serial No. 604,913

7 Claims. (Cl. 23—288)

This invention relates to the arrangement of catalytic material within a reaction chamber and to means adapted to permit more effective temperature control. More particularly, it relates to the construction of catalytic units and their use in reaction chambers for the achievement of better regulated conversion conditions.

The use of catalysts to promote chemical reactions has received extensive attention in commercial processes. For the past few years considerable research has been devoted to the discovery and improvement of catalytic materials which will accelerate desired chemical conversions with the idea that for most reactions there is some material or combination of materials which will catalyze and promote the reactions more efficiently and economically than known methods and catalysts. Concurrent with the increasing use of catalysts has been the development of catalytic apparatus. Numerous types of such apparatus and methods of employing catalytic materials have been proposed. Thus catalytic materials have been prepared as gels, pellets, powders and other forms and have been arranged in solid beds, layers, spaced beds, tubes, suspensions and other manners. Such forms and manners of arrangement have been more or less satisfactory, the particular form and arrangement depending to some extent upon the particular catalytic material being used and the operation in which it is being used, but more efficient ways are constantly being sought.

Temperature and heat control is a problem which is usually more difficult to regulate in chemical conversions employing catalysts than in non-catalyzed reactions. Such control is generally attempted by either direct or indirect methods. In the former method heat-control medium is introduced directly into the stream or body of reactants. In the latter method temperature control is obtained by various modifications of two general systems, one in which heat-control fluid is passed through tubes embedded within the body of catalytic material and the other in which the heat-control medium is passed over the outer surface of tubes or chambers which contain the catalytic material. In either indirect system the effectiveness of the control depends a great deal on the heat conductivity of the catalyst in transmitting heat through the catalytic material to or from the control medium and the conductivity of the material, usually metal, separating the catalyst and the heat control medium. The material between the controlling medium and catalyst is generally more conductive than the catalytic material and seldom, if ever, of as great a thickness as the body of catalyst. Thus a relatively good heat conductive metal tube, housing either the controlling medium or the catalytic material, does not of itself offer much impedance to the transfer or transmission of heat, particularly where there is considerable difference of temperature between the hot and cold regions lying on either side of the metallic walls of the tube. In order to minimize the effect of the deficiency of heat conductivity in the catalytic material, an arrangement of fin-like projections from the source of heat exchange into the bed of catalyst is frequently employed to furnish more heat exchange surface relative to the catalyst mass for cases in which the heat control medium is conducted through tubes in the catalyst bed. These methods of heat control are more or less satisfactory but better methods are highly desirable.

It is therefore an object of this invention to describe a novel catalytic unit adapted to provide more efficient temperature control and reaction conditions.

Another object is to provide a catalyst support disposed within a catalyst tube.

A further object is to describe the disposition of a catalyst support within catalyst tubes and an arrangement of the tubes whereby better control of temperature and reaction conditions is achieved.

A still further object is to provide a catalytic unit for use in reaction chambers whereby sufficient contact surface is available and substantial circulation of vapors is permissible.

Other objects will be readily apparent from a perusal of the following specification and accompanying drawings in which, Figure 1 is an end view of an open catalyst tube showing one arrangement of a catalyst unit within the tube;

Figure 1:
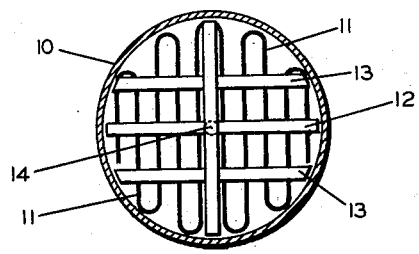

In general the invention involves the novel features of disposing solid catalytic material having an extended surface, in the form of sheets, foraminous members, or the like, such as springs, grid, screens or plates of catalytic material in a conversion zone in a particularly advantageous manner. One preferred arrangement provides for supporting a foraminous catalytic member on a reinforcing form and inserting the supported member into catalyst tubes which may be distributed in a conversion chamber in any well-known manner. Both perforate and imperforate sheets of catalytic material may be used. The catalytic members may be formed into various configurations as more fully described hereinafter and includes metallic members coated with catalytic material, such as aluminum oxide, silica-alumina, various catalytic clays or metallic catalysts which may be plated thereon.

The catalytic material is preferably bent or folded in a convolute form and so arranged that the cross section of the assembled member corresponds substantially to that of the catalyst chamber in which it is to be placed. The convolutions may exist as a spirally wound sheet, a coiled wire or sheets, or screens or other foraminous members folded back and forth in sinuous or undulate fashion to present a large surface area in a small space. Such shapes are illustrated in the drawings and described in greater detail below.

If desired, better heat control in the immediate reaction zone may be realized by placing the catalytic units in the tubes as described and providing for heat exchange material to be passed over these tubes in the catalyst chamber as commonly practiced.

The invention may be more clearly understood by the following discussion with reference to the accompanying drawings which disclose specific embodiments of the invention.

Figure 2:
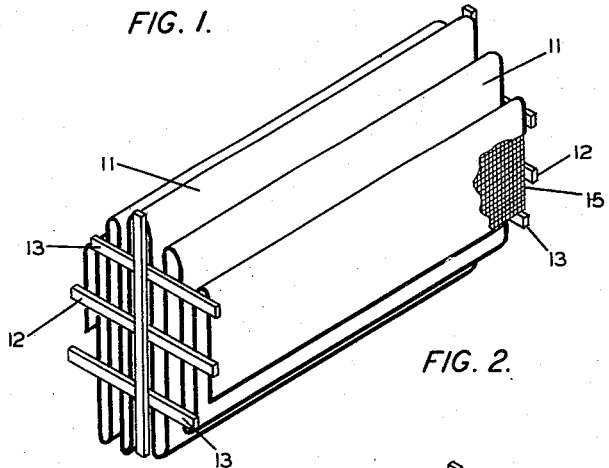
Figure 2 is an isometric view of the modification of catalyst unit shown disposed in a tube in Figure 1.

In Figures 1 and 2, the numeral 10 represents a catalyst tube containing a folded wire screen 11 coated with catalyst. The folded screen 11 is held in the proper shape by a metal support 12 which consists of metal crossbars attached at their centers in the form of a simple Greek cross. For additional support, other shorter bars 13 may be attached to opposite arms of the cross, transverse to the folds of the coated screen, as shown. The bars may be of any desirable breadth and thickness to be substantially rigid and capable of being welded, such as ½ to 2 inches. The crossbars may be spaced uniformly across a central bar. The screen is welded to the support at the points of contact. Such supports are beneficially placed at each end of a strip of formed catalyst screen. Crossbars may also be inserted at points between the ends of the screen, if desired. Still further reinforcement for the coated screen may be obtained by inserting a metal bar 14 lengthwise between the end crossbars and attaching the bar thereto. This longitudinal support may also consist of a bar secured at each end near the top of the central supporting crossbar and another bar secured at each end near the bottom of the crossbar and extending the length of the unit. In this manner the screen may rest on and be supported by the bar along its length. Thus the screens will not sag and lay on the tubes when they are placed in a horizontal position. Furthermore the bar throughout the length of the catalyst unit furnishes rigidity and conformity to the structure of the catalyst member. The bars are not shown in Figure 2 but are extended the length of the unit in the folds of the coated member. A section of the coated member is cut away to show the screen 15 on which the catalyst is applied. The screen may be a foraminous member of such fine mesh that the coating material completely fills and covers the meshes forming a solid outer surface as indicated or the opening of the screen mesh may be of such size that the openings will not be sealed by the coating but the wire will be completely coated and open spaces maintained. This latter construction will allow more degrees of freedom for the flow of the reactants. It is necessary for continuous satisfactory service that the screen and metal supports be constructed of material which is resistant to heat and oxidation. Various alloys which meet this requirement are known in the field of metallurgy. Alloys recognized for these properties are chrome steel alloys such as the well-known 18–8 chrome nickel steel alloy. The material from which the catalytic member is constructed may or may not of itself possess catalytic properties for the reaction. However, the catalytic properties of the metal of the member need not be considered seriously in coated members, since its effect is relatively unimportant after the member is coated with catalytic material.

In the preparation of a coated catalyst member, a slurry or dispersion of the catalyst admixed with water or other dispersing agent may be brushed or sprayed under pressure onto the supporting member and allowed to set. If desirable, to enhance the adhesion of the catalyst to the support a suitable binding material such as a refractory cement may be added to the dispersion. In a modification of the coating procedure where the catalytic material is metallic, the metal may be plated onto the screen or form, as by electroplating. It is usually desirable to form the supporting member approximately into its final shape before the application of the catalytic dispersion to avoid unnecessary handling and flexing of the support after being coated with catalyst. It is desirable that the support in final shape possess as much surface area as possible so that, when the catalyst is applied, there will be a large surface area of catalyst exposed for fluid contact.

The metallic catalyst member may be any of several compressed forms which may be inserted into the catalyst tube. It may be a folded or plaited woven screen or a plate as described, a coiled volute or flat spring plate or screen, or a wire or small rod shaped into a helical spring. If the support is formed into a helical spring, springs of different radii may be formed and disposed concentrically to provide additional catalyst contact area, the largest radius approaching that of the tube. Suitable supporting end pieces and inter-connecting bars may be employed to carry the load of the catalyst member.

Figure 3:
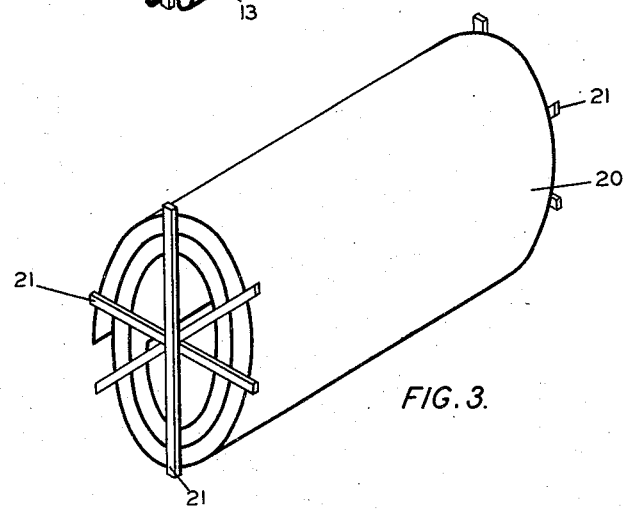
Figures 3 and 4 are other modifications of the catalyst unit.

Figure 3 is an isometric view of another modification of the catalyst unit. The catalyst member 20 is spirally wound and secured at each end by mooring crossbars 21 which are joined together at their centers. For additional rigidity a metallic bar or bars may also be inserted longitudinally between the end members and secured thereto. The catalyst member may be perforate or imperforate plate or sheet or woven screen of catalytic material or metal coated with catalyst.

Figure 4:
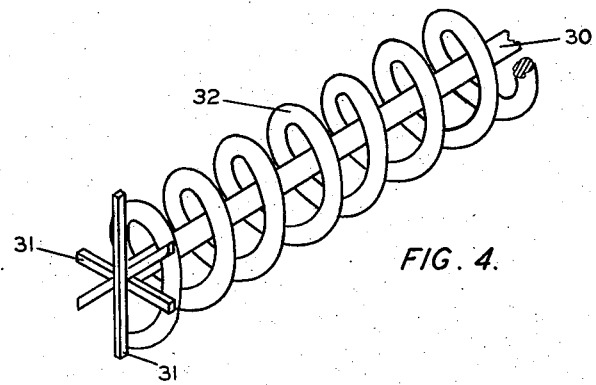

Figure 4 illustrates a section of still another arrangement of a catalyst unit. The metallic reinforcing bar 30 is enlarged out of proportion with the crossbars 31 which are secured at each end of the unit and shown in place at the end of the unit illustrated by the figure. The bar and end crossbars are usually ½ to 2 inches in breadth and thickness, the particular dimensions depending upon the material used, its relative rigidity and unit weight. The catalytic member 32 has been relatively somewhat enlarged for a clearer perspective in the drawing. The member is preferably a helical spring formed from wire of sufficient body to substantially retain its form. For simplification of the drawing only one coil is shown, but for more effective contact surface of catalyst the catalyst unit may be composed of several concentric coils of different radii, the largest of which approaches that of the radius of the tube in which it is to be used.

Figure 5:
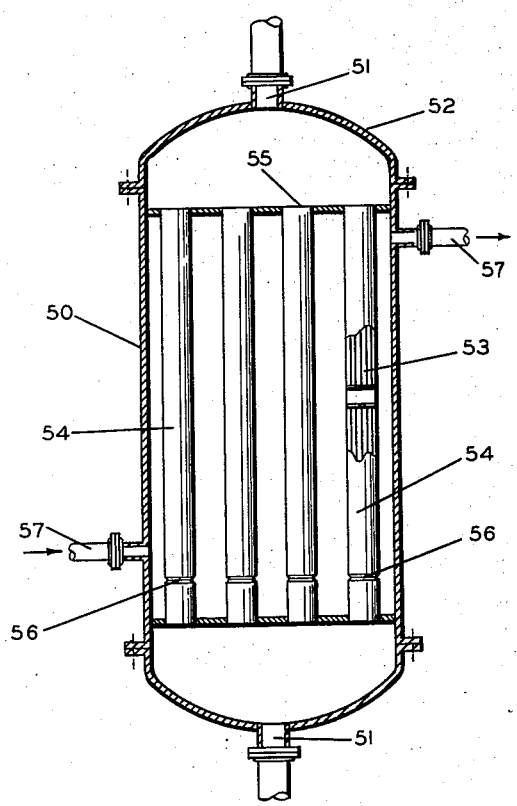
Figure 5 is a diagrammatic view showing one manner of utilizing the catalyst unit in a chamber.

Figure 5 is a cross-sectional view of an arrangement of catalytic units in a conversion chamber. In the drawing the numeral 50 represents a catalyst chamber having inlet and outlet openings 51 and a cover plate 52. Catalytic units 53 are disposed in catalyst tubes 54. For purposes of clarity the two adjacent units shown in cross-section are slightly separated but in actual arrangement the units are contiguous, resting one against the next. The catalytic units may be inserted and removed from the openings 55 at the end of the tubes. Removal of the units may be accomplished in any convenient manner as by hooking the end crossbars from above and lifting them out or pushing the units up from the lower end of the tubes. Inwardly projecting ledges or constrictions 56 at the lower ends of the tubes prevent the units from dropping out of the tubes. If these projecting ledges or constricting members are formed of a removable plate, a simplified manner of removing the units is provided by removing the plate and allowing the units to drop out. Inlet and outlet openings 57 are provided in the chamber for introducing and removing a stream of heat control medium. For endothermic reactions the heat control medium may be a stream of products of combustion of sufficient temperature that the heat transfer rate through the tube wall is equal to the endothermic heat of reaction and thereby the temperature of the vapors in contact with the catalyst remains constant. As a result of the constant temperature the optimum reaction rate is maintained. For exothermic reactions optimum conversion temperature may be obtained by decreasing the temperature of the combustion gases or by passing other heat control medium over the catalyst tubes or through the channels conveying the controlling medium. The present invention may be employed with any catalyst chamber in which the catalyst is disposed in tubes within the chamber. Likewise the chamber and/or tubes may be placed in any suitable position such as vertically, as shown, horizontally or obliquely.

The practice of the invention is particularly advantageous in hydrocarbon conversions which may employ catalysts, such as cracking and reforming, dehydrogenation, hydrogenation, polymerization, alkylation, and other hydrocarbon conversions. As explained above, catalytic materials are in general poor conductors of heat and hence temperature control is a serious problem in conversion conducted in chambers with solid beds or packed tubes of catalyst. By operating and arranging the catalyst as disclosed in the present invention, better heat control is obtained. The amount of unfilled space in the catalyst tube permits better circulation in the tubes which promotes a substantial increase in the rate of heat exchange and consequently allows better control of optimum conversion temperature while, at the same time, sufficient amount of coated metal may be placed in the reaction space to insure satisfactory contact area.

This method of contact has an advantage over reaction chambers filled with a mass of granular catalyst in which case the heat of reaction is not added or removed effectively from the reacting mass which causes the temperature of the reacting mass either to increase or decrease according to the type of reaction. Due to this change in temperature the reaction rate becomes either higher or lower than the optimum rate and results in the production of undesirable products or decreased conversion. With the arrangement of the catalyst as described in this invention, temperature control is effectively improved and these undesirable conditions are substantially eliminated.

In the case of endothermic reactions the arrangement of catalyst described herein avoids the necessity of preheating the charge to higher temperatures than the reaction temperature which is frequently done to compensate for heat lost during reaction and to maintain at least reaction temperature, and thus without excess heating the present arrangement avoids undesirable thermal reactions taking place before the liquid or vapors contact the catalyst.

Furthermore, by using the catalyst in the form provided in this invention and thus avoiding the packing inherent with catalyst in beds or packed tubes, a lower pressure drop is realized throughout the reaction zone since there is less resistance to the flow of the reactants. With a lower pressure drop occurring in the chamber, less expensive equipment and less pumping apparatus may generally be used. A lower pressure drop is also advantageous since pressure regulation is simpler and this feature is especially advantageous for those reactions in which the control of the pressure is critical.

Another important advantage is the ease with which the catalyst may be removed when it becomes necessary to replace catalyst for any purpose such as a condition in which the catalyst has become deteriorated to a point that it can no longer be satisfactorily regenerated. In packed catalyst tubes it often happens that the catalyst becomes fused with itself and rather firmly attached to the tube wall by possibly excessive temperature conditions during reaction or regeneration. Under such circumstances the catalyst is extremely difficult to remove and considerable time may be lost in reconditioning the catalyst tube. Under the conditions of the present invention such a situation cannot arise because of closer temperature control and the absence of contact between catalyst and tube wall. The invention is intended to cover the feature of constructing the end crossbars of the catalytic unit slightly longer than the breadth of the catalyst member to support the unit away from the walls of the catalyst tubes. Deterioration or destruction of the catalytic unit at any point along the length of the unit is easily determined with the present arrangement and replacements of catalytic units may easily be made.

Although the invention has been described in connection with use in a tube-filled catalyst chamber other tubular conversion apparatus, such as catalyst tube conversion furnaces, may be employed with equal success. The catalyst tubes may be employed in the same manner in any of the usual horizontal or vertically disposed catalyst chambers. The catalyst unit may be of a length equal to that of the tube in which it is used or it may be formed in shorter lengths and two or more units inserted into the catalyst tube.

Various other modifications and arrangements may be made without departing from the spirit of the invention which is not intended to be limited to any particular description or exemplary arrangement which is disclosed merely to describe the invention more fully.

I claim:

1. A catalyst chamber for the conversion of hydrocarbons which comprises an enclosing shell wall, inlet and outlet openings for introducing and removing reactants and products, a plurality of catalyst tubes within said shell walls, means for directing said hydrocarbons through said catalyst tubes, and at least one catalytic element in each tube, each catalytic element comprising a catalytic member of relatively large surface area and composed of a continuous metallic catalytic sheet folded and plaited in an undulate and sinuous manner such that the folds are relatively compact but with substantial free space between said folds and the external shape of the element conforms roughly to the interior of the tube and wherein each element contains a plurality of crossbars affixed at each end of said catalytic member and at least one longitudinal rigid bar coextensive with and contiguous to the crest of a fold to furnish support for said member.

2. A catalyst element comprising a continuous catalytic metallic sheet of undulate plaited form in which the folds are relatively compact but with substantial free space therebetween, a plurality of crossbars which are fastened at each end of said element and which extend beyond the outer boundaries of said folds, and at least one longitudinal rigid bar affixed at each end thereof to a corresponding crossbar of said element and coextensive and contiguous with a fold of said sheet to furnish support for said element.

3. A catalytic unit according to claim 2 in which said catalytic sheet is an undulate metallic screen.

4. The catalyst unit of claim 2 in which said metallic sheet is a metallic screen of catalytic material.

5. The catalyst unit of claim 2 in which said metallic sheet is a metallic screen impregnated with catalytic material.

6. A catalytic unit according to claim 2 in which said catalytic element is a metallic sheet coated with catalytic material.

7. A catalyst unit for use in a tubular catalyst chamber, comprising a metallic tube containing at least one catalyst element, said catalyst element being constructed of a continuous metallic sheet of undulate plaited form in which the folds are relatively compact but with substantial free space therebetween and in which successive folds outwardly in either direction from a center fold are progressively narrower such that the external shape of the element conforms roughly to the interior of said tube, a plurality of crossbars which are fastened at each end of said element and which extend beyond the periphery of said element in a manner such that said element is supported away from the sides of the surrounding tube, and at least one longitudinal rigid bar affixed at each end thereof to a corresponding crossbar of said element and coextensive with and contiguous to a wider center fold to furnish support for said element.

JESSE A. GUYER.

REFERENCES CITED

The following references are of record in the file of this patent:

UNITED STATES PATENTS

| Number | Name | Date |
|---|---|---|
| 1,846,235 | Wade | Feb. 23, 1932 |

FOREIGN PATENTS

| Number | Country | Date |
|---|---|---|
| 527,401 | France | July 25, 1921 |
| 567,480 | France | Dec. 7, 1923 |